A. N. McKELLIPS.
DISK PLOW AND BEAM THEREFOR.
APPLICATION FILED DEC. 27, 1911.
1,045,421.
Patented Nov. 26, 1912.
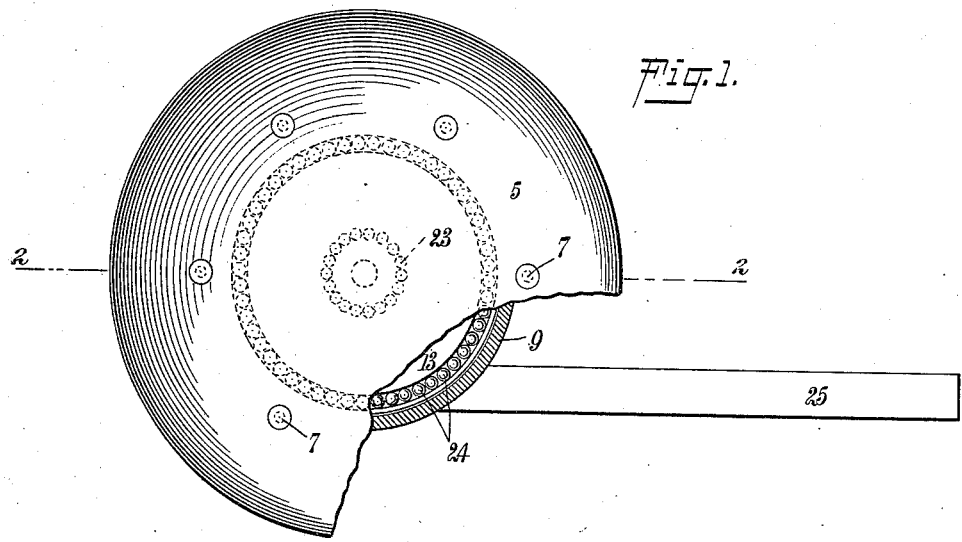
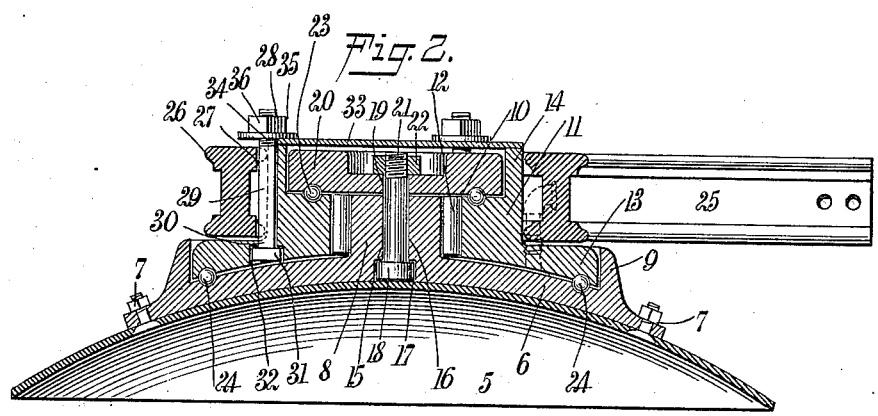
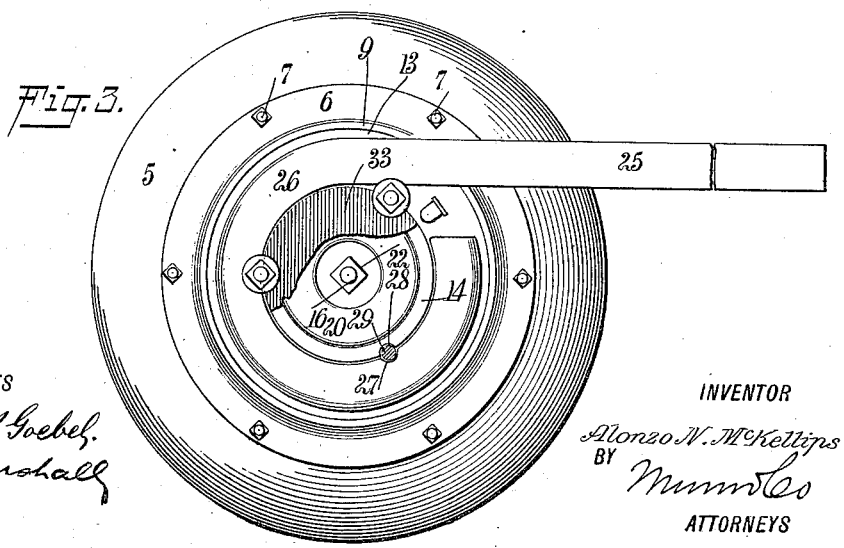
WITNESSES
William P. Goebel.
E. B. Marshall
INVENTOR
Alonzo N. McKellips
BY
Munn & Co
ATTORNEYS

UNITED STATES PATENT OFFICE.

ALONZO N. McKELLIPS, OF BILLINGS, MONTANA.

DISK PLOW AND BEAM THEREFOR.

1,045,421.  Specification of Letters Patent.  Patented Nov. 26, 1912.

Application filed December 27, 1911. Serial No. 668,048.

*To all whom it may concern:*

Be it known that I, ALONZO N. MCKELLIPS, a citizen of the United States, and a resident of Billings, in the county of Yellowstone and State of Montana, have invented a new and Improved Disk Plow and Beam Therefor, of which the following is a full, clear, and exact description.

My invention relates to disk plows, and it has for its object to provide one with a beam having a curved end, and disposed around and secured to a bearing, in which is journaled a stud secured to and projecting from a disk. Inasmuch as the curved end of the beam extends around not only the bearing, but also the stud on the disk, the construction is such that the plow may be made very strong, without increasing its weight in any way.

Another object of the invention is to so construct and assemble the parts that repairs may be readily made, and the worn parts may be readily replaced.

Still other objects of the invention will appear in the following complete specification, in which the preferred form of the invention is disclosed.

In the drawings similar characters of reference indicate corresponding parts in all the views, in which—

Figure 1 is an elevation showing one side of the invention, parts being broken away; Fig. 2 is an enlarged sectional view on the line 2—2 of Fig. 1; and Fig. 3 is an elevation showing the other side of the device, and with parts broken away to show the construction.

By referring to the drawings it will be seen that a disk 5 is provided, which is concavo-convex in shape, a member 6 being disposed against the outer side of the disk 5, and being secured thereto by the bolts 7. This member 6 has a stud 8, projecting therefrom, and a circular rim 9, concentric with the stud 8. The stud 8 is disposed in the opening 10 in the bearing 11, roller bearings 12 being disposed between the stud 8 and the bearing 11. This bearing 11 at one end has a radially-extending annular shoulder 13, which is disposed within the rim 9, and at the other end the bearing 11 has a circular flange 14. Extending through the stud 8 there is a longitudinal opening 15, in which is disposed the bolt 16, there being a recess 17 in the member 6, for receiving the head 18 of the said bolt 16. This bolt 16 projects beyond the stud 8, and is disposed through an opening 19 in a head member 20. The head member 20 is disposed within the circular flange 14. This bolt 16 is threaded at 21, for receiving a nut 22, which is provided for holding the head member 20 on the end of the stud 8. Ball bearings 23 are disposed between the end of the bearing 11 and the head member 20, and ball bearings 24 are disposed between the annular radially-extending shoulder 13 on the bearing 11, and the member 6. The beam 25 has its end 26 curved around the bearing 11, and the circular flange 14, there being transverse grooves 27 on the inner side of the curved end 26 of the beam, which are opposite the transverse grooves 28 on the outer side of the bearing 11, and the circular flange 14. In each pair of grooves 27 and 28 there is disposed a bolt 29, the bolt 29 extending through an opening 30 in the annular radially-extending shoulder 13, the heads 31 of the bolt being disposed in recesses 32 in the said annular shoulder 13. Disposed on the end of the annular flange 14, for closing the operating parts, there is a plate 33, this plate 33 having recesses 34, through which the bolts 29 extend. Washers 35 are disposed on the bolts, and rest against the plate 33, these washers 35 being engaged by the nuts 36 which, with the washers 35, serve to hold the plate 33 and the curved end 26 of the beam 25 in place, the bearing 11 being held in place by the head member 20.

As the disk plow is constructed the beam 25 which serves as a draft member is disposed around the bearing 11, and the circular flange 14, and also around the head member 20, and a portion of the stud 8. This produces a very strong construction, while still permitting the members to be taken apart, so that repairs may be quickly made, and worn members may be replaced.

Having thus described my invention I claim as new and desire to secure by Letters Patent:

1. In a disk plow and beam therefor, a bearing having transverse grooves on its outer periphery, a draft member having a bent portion disposed around the bearing and provided with inner transverse grooves, disposed opposite the first-mentioned transverse grooves, bolts secured relatively to the bearing, and disposed in the grooves, means for engaging the bolts for holding the draft member in position on the bearing, and a disk having a stud journaled in the bearing.

2. In a disk plow and beam therefor a bearing having radially extending shoulders, there being a transverse groove on the outer periphery of the bearing, a draft member having a bent portion disposed around the bearing, and provided with an inner transverse groove, disposed opposite the first transverse groove, a bolt secured relatively to the bearing and disposed in the groove, means engaging the bolt for holding the draft member in position on the bearing, and a disk having a stud journaled in the bearing and a circular rim engaging the shoulder on the bearing.

3. In a disk plow and beam therefor a disk, a stud secured to and projecting from the disk, a bearing in which the stud is journaled and having a radially extending shoulder at its inner end, a circular flange extending from the outer end of the bearing, there being openings through the radially extending shoulder on the bearing, the openings being continued in the form of grooves in the bearing, a beam having an end disposed around the bearing beyond the shoulder and being provided with transverse grooves disposed opposite the first-mentioned grooves, a plate disposed against the end of the circular flange and having recesses registering with the grooves, and bolts extending through the recesses in the plate, the openings in the radially extending shoulder and in the grooves for holding the plate in the direction of the first-mentioned member.

4. In a disk plow and beam therefor, a member having a stud with an opening through the member and the stud, a disk, means by which the member is secured to the disk, a circular rim on the member concentric with the stud, a bearing in which the stud is journaled and having a radially-extending shoulder at its inner end, and disposed within the rim, a circular flange extending from the outer end of the bearing, a head member disposed within the circular flange and having an opening registering with the first-mentioned opening, a bolt disposed through the opening for holding the head member on the stud, there being openings through the radially-extending shoulder on the bearing, the openings being continued in the form of grooves in the bearing, a beam having an end extending around the bearing with inner transverse grooves, a plate disposed against the end of the circular flange, and having recesses registering with the grooves, and bolts disposed through the recesses in the plate, the openings in the radially-extending shoulder, and in the grooves, for holding the plate in the direction of the first-mentioned member.

In testimony whereof I have signed my name to this specification in the presence of two subscribing witnesses.

ALONZO N. McKELLIPS.

Witnesses:
E. B. CAMP,
HARRY H. BURBANK.

Copies of this patent may be obtained for five cents each, by addressing the "Commissioner of Patents, Washington, D. C."